United States Patent
Gorobets

(10) Patent No.: US 7,809,994 B2
(45) Date of Patent: Oct. 5, 2010

(54) ERROR CORRECTION CODING FOR MULTIPLE-SECTOR PAGES IN FLASH MEMORY DEVICES

(75) Inventor: Sergey Anatolievich Gorobets, Edinburgh (GB)

(73) Assignee: SanDisk Corporation, Milpitas, CA (US)

( * ) Notice: Subject to any disclaimer, the term of this patent is extended or adjusted under 35 U.S.C. 154(b) by 393 days.

(21) Appl. No.: 11/383,844

(22) Filed: May 17, 2006

(65) Prior Publication Data

US 2007/0271494 A1    Nov. 22, 2007

(51) Int. Cl.
*G06F 11/00* (2006.01)
(52) U.S. Cl. ......................................... 714/52
(58) Field of Classification Search ............ 714/52
See application file for complete search history.

(56) References Cited

U.S. PATENT DOCUMENTS

| | | | |
|---|---|---|---|
| 5,172,338 A | 12/1992 | Mehrotra et al. | |
| 6,353,910 B1 | 3/2002 | Carnevale et al. | |
| 6,747,892 B2 | 6/2004 | Khalid | |
| 7,315,916 B2 | 1/2008 | Bennett et al. | |
| 7,366,826 B2 | 4/2008 | Gorobets et al. | |
| 2003/0056141 A1* | 3/2003 | Lai et al. .................... | 714/6 |
| 2003/0099140 A1 | 5/2003 | Payne et al. | |
| 2003/0123287 A1* | 7/2003 | Gorobets ................. | 365/185.11 |
| 2003/0156454 A1* | 8/2003 | Wei et al. ................ | 365/185.17 |
| 2004/0083334 A1 | 4/2004 | Chang et al. | |
| 2004/0103238 A1* | 5/2004 | Avraham et al. ......... | 711/102 |
| 2004/0123020 A1* | 6/2004 | Gonzalez et al. ......... | 711/103 |
| 2004/0153902 A1 | 8/2004 | Machado et al. | |
| 2007/0300130 A1 | 12/2007 | Gorobets | |

OTHER PUBLICATIONS

International Search Report and Written Opinion for PCT/US2007/068797, dated Apr. 10, 2008, 12 pages.
Office Action issued in U.S. Appl. No. 11/383,841, dated Jan. 6, 2010 (18 pages).
Office Action issued in U.S. Appl. No. 11/383,841, dated Apr. 29, 2009 (16 pages).
Office Action issued in U.S. Appl. No. 11/383,841, dated Aug. 21, 2008 (15 pages).

* cited by examiner

*Primary Examiner*—Scott T Baderman
*Assistant Examiner*—Yair Leibovich
(74) *Attorney, Agent, or Firm*—Brinks Hofer Gilson & Lione

(57) ABSTRACT

A flash memory system, including a flash memory device and a controller, and having improved efficiency error correction coding (ECC), is disclosed. Each page in the flash memory device has the capacity to store multiple sectors' worth of data. However, partial page programming (i.e., followed by a later write to fill the page) is prohibited for reliability reasons. A scratchpad block within the flash memory device is designed, and stores both user data and control data. ECC efficiency is improved by encoding the ECC, or parity, bits over the entire data block corresponding to the user and control data in the page. Retrieval of a particular sector of data requires reading and decoding of the entire page. Especially for codes such as Reed-Solomon and BCH codes, the larger data block including multiple sectors' data improves the error correction capability, and thus enables either fewer redundant memory cells in each page or improved error correction.

28 Claims, 8 Drawing Sheets

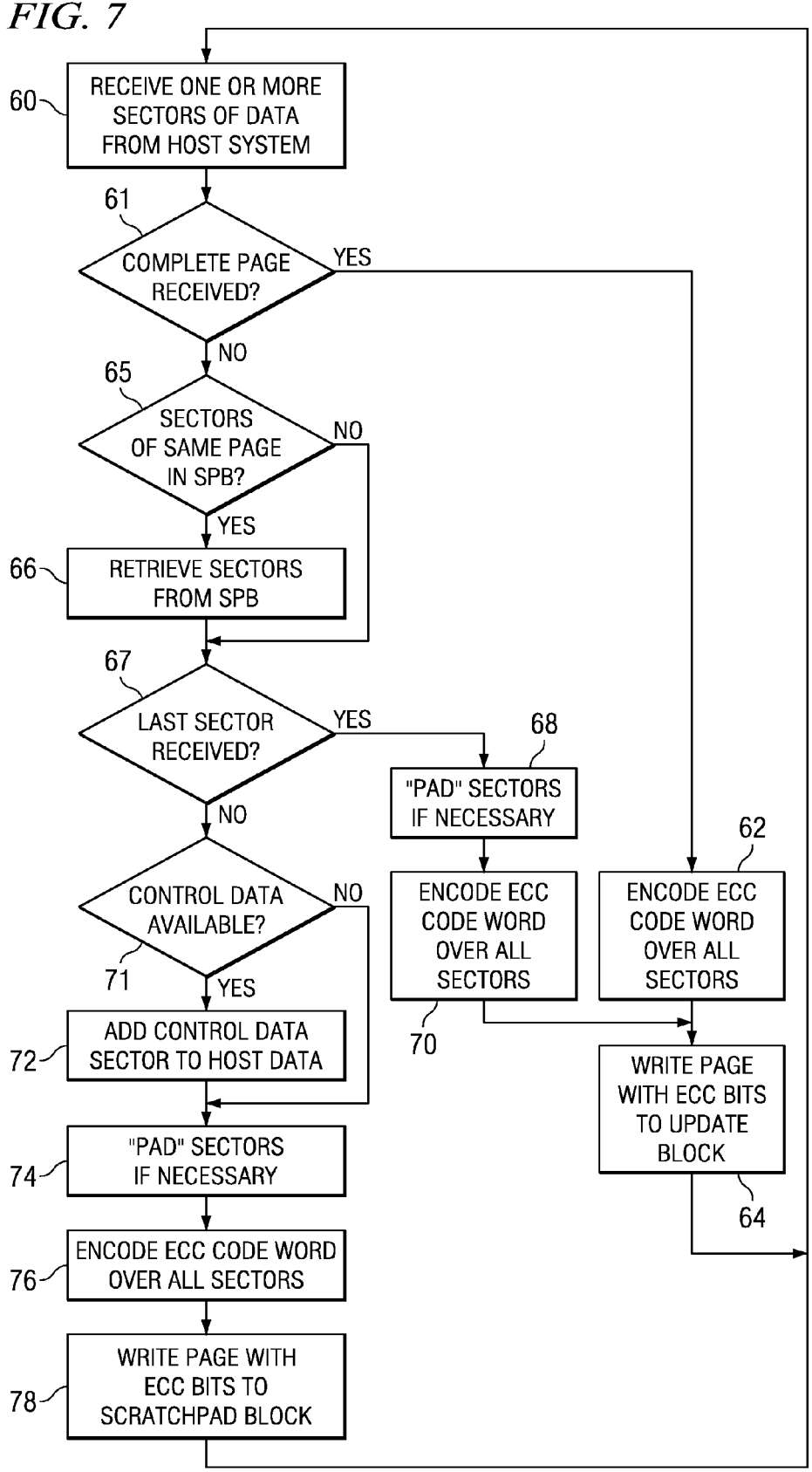

ERROR CORRECTION CODING FOR MULTIPLE-SECTOR PAGES IN FLASH MEMORY DEVICES

CROSS-REFERENCE TO RELATED APPLICATIONS

This application is related to co-pending application Ser. No. 11/383,841, entitled "Method of Error Correction Coding for Multiple-Sector Pages in Flash Memory Devices", commonly assigned with, and having the same filing date as, this application.

STATEMENT REGARDING FEDERALLY SPONSORED RESEARCH OR DEVELOPMENT

Not applicable.

BACKGROUND OF THE INVENTION

This invention is in the field of non-volatile memory, and is more specifically directed to error correction coding in non-volatile solid-state memory devices of the flash type.

As well known in the art, "flash" memories are electrically-erasable semiconductor memory devices that can be erased and rewritten in relatively small blocks, rather than on a chip-wide or large-block basis as in previous electrically-erasable programmable read-only memory (EEPROM) devices. As such, flash memory has become especially popular for applications in which non-volatility (i.e., data retention after removal of power) of the stored data is essential, but in which the frequency of rewriting is relatively low. Examples of popular applications of flash memory include portable audio players, "SIM" card storage of telephone numbers and phone activity in cellular telephone handsets, "thumbkey" removable storage devices for computers and workstations, storage devices for digital cameras, and the like.

There are many commercially successful non-volatile memory products being used today, particularly in the form of small form factor cards that include one or more integrated circuit chips to realize a flash EEPROM memory array. A memory controller, usually but not necessarily on a separate integrated circuit chip from the memory array, interfaces with a host to which the card is removably connected and controls operation of the memory array within the card. Such a controller typically includes a microprocessor, some non-volatile read-only-memory (ROM), a volatile random-access-memory (RAM), and one or more special circuits, such as an encoder and decoder for implementing an error-correction-code (ECC) on data passing through the controller during the programming and reading of data into and from the memory. Modern and commercially available flash memory cards include COMPACTFLASH (CF) cards, MULTIMEDIA cards (MMC), SECURE DIGITAL (SD) cards, personnel tags (P-Tag), and MEMORY STICK cards. Conventional host systems that can utilize such flash memory cards include personal computers, notebook computers, personal digital assistants (PDAs), various data communication devices, digital cameras, cellular telephones, portable audio players, automobile sound systems, and similar types of equipment. The removable flash memory card in some systems does not include a controller, in which case the host itself controls operation of the memory array in the card. Examples of this type of memory system include SMART MEDIA cards and xD cards. According to these two classes of memory cards, control of the memory array may be achieved by software on a controller in the card, or by control software in the host for those cards that do not have a controller function. In addition, besides the memory card implementation, this type of memory can alternatively be embedded directly into host systems, of various types. In both the removable and embedded applications, host data is stored in the memory array according to a storage scheme implemented by memory control software.

An important recent advance in semiconductor non-volatile memory technology is the arrangement of the flash memory cells as "NAND" memory rather than as "NOR" memory. As known in the art, NOR flash memory refers to the conventional arrangement of a column of memory cells in parallel between a bit line and a source line. Access of a specific cell in a NOR column is made by driving its word line (control gate) active while holding the other cells in the column off, so that the current between the bit line and source line is determined by the state of the accessed cell. Memory cells in a column of NAND memory, on the other hand, are connected in series between the bit line and the source line. Accessing of a specific cell in a NAND column thus requires turning on all of the cells in the column with active word line levels, and applying an intermediate word line level to the cell to be accessed, such that the current between the bit line and source line is, again, determined by the state of the accessed cell. As well known in the art, the chip area required per bit of NAND flash memory is much reduced from the area per bit of NOR flash memory, primarily because fewer conductors (and therefore contacts) are required for a column of NAND memory relative to NOR memory; in addition, access transistors can be shared among a large number of cells in the NAND arrangement. Additionally, conventional NAND flash memory is conveniently accessed serially, for example by sequentially accessing cells along the columns, rather than as a random access memory as in the case of NOR memory. NAND memory is thus especially well-suited for music and video storage applications Another important recent advance in the field of flash memory is referred to in the art as the multilevel program cell (MLC). According to this approach, more than two data states are made possible for each memory cell, simply by more finely controlling the programming of the cell. In conventional binary data storage, each memory cell is programmed into either a "0" or a "1" state. Reading of such binary cells is accomplished by applying a single control voltage to the control gate of the addressed memory cell so that the transistor conducts if programmed to a "1" state, but remains off in the "0" state; sensing of the conduction through the addressed memory cell thus returns the programmed state of the cell. In contrast, according to a typical example of the MLC approach, four possible states are defined for each memory cell, typically corresponding to binary values 00, 01, 10, 11. In effect, the two intermediate states correspond to two levels of partial programming of the cell between the fully erased and fully programmed states. Some implementations of MLC flash memory with up to eight possible states, or three binary bits, per cell are known. The ability to store two or three bits of data on each memory cell immediately doubles or triples the data capacity of a flash memory chip. Examples of MLC flash memory cells and memories including such MLC cells are described in U.S. Pat. No. 5,172,338, and U.S. Pat. No. 6,747,892 B2, both commonly assigned herewith and incorporated herein by this reference.

The combination of MLC technology with the efficiencies of NAND flash memory architectures has resulted in significantly reduced cost per bit for semiconductor non-volatile storage, as well as improved system reliability, and a higher data capacity and system functionality for a given form factor.

Modern flash memory devices, particularly those of the NAND architecture and involving MLC cells, are arranged in "blocks" and "pages". A block refers to an erase unit, and defines a group of cells that are simultaneously erased in a single erase operation. Typically, a block of cells is smallest group of cells that can be erased. A page refers to a programming unit, and defines a group of cells that are simultaneously programmed, or written, in a single programming operation. Each block typically includes multiple pages. Generally, the arrangement of cells into pages and blocks is based on the physical realization of the memory array. For example, in many NAND memory arrays, a page of memory cells is defined by those cells that share the same word line, and a block is defined by those pages residing in the same "NAND" chain. For example, if a NAND chain includes thirty-two memory cells in series, a block will include thirty-two pages.

Historically, the organization of data stored in a flash memory has followed the file systems used in connection with magnetic disk storage, and as such is based on "sectors". A sector is typically a group of data of a fixed size, for example, 512 bytes of user data plus some number of bytes of overhead. In many modern file systems, the operating system of the computer or other host system arranges data into sectors, and writes data to and reads data from non-volatile storage on a sector-by-sector basis. To permit convenient use of flash memory devices as non-volatile storage devices in such systems and applications, many modern flash memories handle data in a similar fashion, mapping logical "sector" addresses to physical addresses in the flash memory array.

In recent years, the sizes and capacities of flash memory devices have greatly increased, resulting in memory arrays of more than 1 million cells. In such arrays, a single word line may extend to over 2000 memory cells, placing that many memory cells within the same page, or programming unit. In such large scale flash memories, therefore, each page now includes multiple sectors. As such, the host system will be communicating units of data to the flash memory that are smaller than the smallest programming unit in the device.

Conventional flash memories have handled the writing of sectors within a page by way of "partial page programming". To perform programming of a partial page, for example in programming one of four sectors within a page, the word line for the page receives the high programming voltage, but only those memory cells on that word line within the sector being programmed (and, of course, those memory cells within that sector that are to receive a programmed data state) receive source and drain voltages (via the bit lines and the other cells in the NAND chain) that enable programming. As such, individual sectors may be separately written into the same page.

However, as device geometries continue to shrink in order to realize more memory capacity within a flash memory device, the reliability of the floating-gate transistors of the memory cells becomes more fragile. And it has been observed that the driving of programming voltages onto the word line, or control gate of the floating-gate transistor, tends to stress those transistors that are not being programmed. For example, in a page having four sectors, and in which each sector is individually written, each cell will receive three additional programming cycles beyond that of its own sector, and will thus receive four times the stress that it would have received from only a single programming cycle. As such, it is contemplated that modern flash memory devices will prohibit partial page programming, to preserve the reliability of the device. Under this constraint, flash memory devices or memory controllers will buffer the data for individual sectors until all sectors in the page can be programmed in the same programming operation.

By way of further background, the use of error correction coding (ECC) in mass data storage devices and storage systems, as well as in data communications systems, is well known. As fundamental in this art, error correction coding involves the storage or communication of additional bits (commonly referred to as parity bits, code bits, checksum, etc.) that are determined or calculated based on the data bits being encoded. For example, in the case of ECC for data storage, the actual data is used in encoding a code word that has more bits than the actual data itself. To retrieval the stored data, the stored code word is decoded according to the same code as used to encode the code word. Because the code bits "over-specify" the actual data portion of the code word, some number of errored bits can be tolerated, without any loss of actual data evident after decoding.

Many coding schemes for ECC are well known in the art. These conventional error correction codes are especially useful in large scale memories, including flash memories, because of the substantial impact on manufacturing yield and device reliability that such coding schemes can provide, rendering devices that have a few non-programmable or defective cells as useable. Of course, a tradeoff exists between the yield savings and the cost of providing additional memory cells to store the code bits (i.e., the code "rate"). As such, some ECC codes are better suited for flash memory devices than others; generally, ECC codes for flash memory devices tend to have higher code rates (i.e., a lower ratio of code bits to data bits) than the codes used in data communications applications (which may have code rates as low as ½). Examples of well-known ECC codes commonly used in connection with flash memory storage include Reed-Solomon codes, other BCH codes, Hamming codes, and the like. Typically, the error correction codes used in connection with flash memory storage are "systematic", in that the data portion of the eventual code word is unchanged from the actual data being encoded, with the code or parity bits appended to the data bits to form the complete code word.

By way of further background, FIG. 1 illustrates the arrangement of actual data ("payload" data) and code bits in multi-sector page 8 of a conventional flash memory device. As shown in FIG. 1, page 8 includes four sectors 100 through 101, each of which includes a data portion 11, ECC bit portion 12, and header 13. Data portion 11 typically occupies the majority of the cells in a given sector 10; for example, a typical sector 10 of 528 bytes will include 512 bytes as data portion 11, and another sixteen bytes for ECC bit portion 12 and header 13. And as illustrated in FIG. 1, the data portions 11 of the various sectors 10 within a given page 8 may store different types of data. In page 8 of FIG. 1, data portions 11 of sectors $10_0$, $10_1$, $10_2$ store "user" data, which is data generated by an application or user of the system including the non-volatile memory containing page 8. Data portion 11 of sector $10_3$ stores "control" data, such control data including information useful in the operation of the non-volatile memory, such as address tables for logical-to-physical address mapping, erase counts, status information, and the like. The control data in data portion 11 of sector $10_3$ may or may not pertain to the user data in data portions 11 of sectors $10_0$ through $10_3$, and may or may not be synchronous in time with that user data (i.e., it may have been written at a substantially different time from the user data). Header portions 13 for each sector $10_0$ through $10_3$ stores control information for its sector, such control information including identifying information for its associated sector, and status information regarding the data in its associated data portion 11.

As mentioned above, the operating system that controls the writing and reading of data to and from the memory containing page 8 arranges the data in the form of sectors, analogous (or identical) to the arrangement of data as stored on a magnetic disk drive. As such, if a large amount of data is to be written to non-volatile memory, that data is grouped into sectors (e.g., 512 bytes), and presented to the memory controller or other logic for effecting the write of that data to the non-volatile memory. A controller or other logic for the flash memory containing page 8 of FIG. 1 uses the payload data (user or control) for a given sector to calculate the ECC bits for that sector. In other words, the ECC bits for a sector depend only on the data for that sector, and not on the data contents in any other sector of the page. The number of ECC bits generated for a code word of a given size depends on the particular code being used and, of course, on the length of the data block being encoded. Upon the writing of the data to data portion 11 of a selected sector 10, the calculated ECC bits are written to ECC bit portion 12 for that sector, along with the appropriate header data written to header portion 13. And, upon reading of a sector of data from data portion 11 of a selected sector, the contents of the ECC bit portion 12 for that sector is also read, and is used to detect (and possibly correct) errors in the data retrieved from that data portion 11.

As noted above, the number of code bits generated by conventional ECC codes depends on the number of bits in the data being encoded. One can consider the "efficiency" of a code by considering the ratio of the additional code bits to the number of data bits being encoded; another known measure of this efficiency is the "code rate", which is the ratio of the number of data bits to the total bits (code bits plus data bits). By way of further background, it is known that conventional ECC codes, such as Reed-Solomon and BCH coding, tend to be more efficient when encoding larger code blocks.

BRIEF SUMMARY OF THE INVENTION

It is therefore an object of this invention to provide a flash memory device that implements a more efficient error correction coding approach.

It is a further object of this invention to provide such a device that can be implemented in large-scale NAND flash memory, in which the smallest programming unit includes multiple data sectors.

It is a further object of this invention to provide such a device that is suitable for such large-scale NAND flash memory in which partial page programming is prohibited.

Other objects and advantages of this invention will be apparent to those of ordinary skill in the art having reference to the following specification together with its drawings.

The present invention may be implemented into a flash memory device in which pages, or programming units, are arranged to store multiple sectors of data. According to this invention, error correction coding is applied by combining the data for all sectors of a page into a unitary data block, with the encoding based on that data block that includes data from all sectors of data of the page taken together. The sectors of data so encoded can be of different types, such as including user data, and also control data unrelated to that user data. To read a specific sector from a page, the entire page is read and decoded, after which the desired sector data is selected and output.

BRIEF DESCRIPTION OF THE SEVERAL VIEWS OF THE DRAWING

FIG. 7 is a flow chart illustrating the operation of the controller of FIG. 4 in effecting data writes, according to the preferred embodiment of the invention.

DETAILED DESCRIPTION OF THE INVENTION

The present invention will be described in connection with its preferred embodiment, namely as implemented into a flash memory of the NAND type, in which multilevel cell (MLC) programming is available. It is contemplated that this invention will be especially beneficial in such an application. However, it is also contemplated that this invention may provide benefit in other memory applications. For example, the invention may be used in connection with a wide range of solid-state non-volatile (or even volatile) memory, including such memory types as re-writable memory, erasable memory, and one-time-programmable (OTP) memory. Accordingly, it is to be understood that the following description is provided by way of example only, and is not intended to limit the true scope of this invention as claimed.

Figures 1, 2:
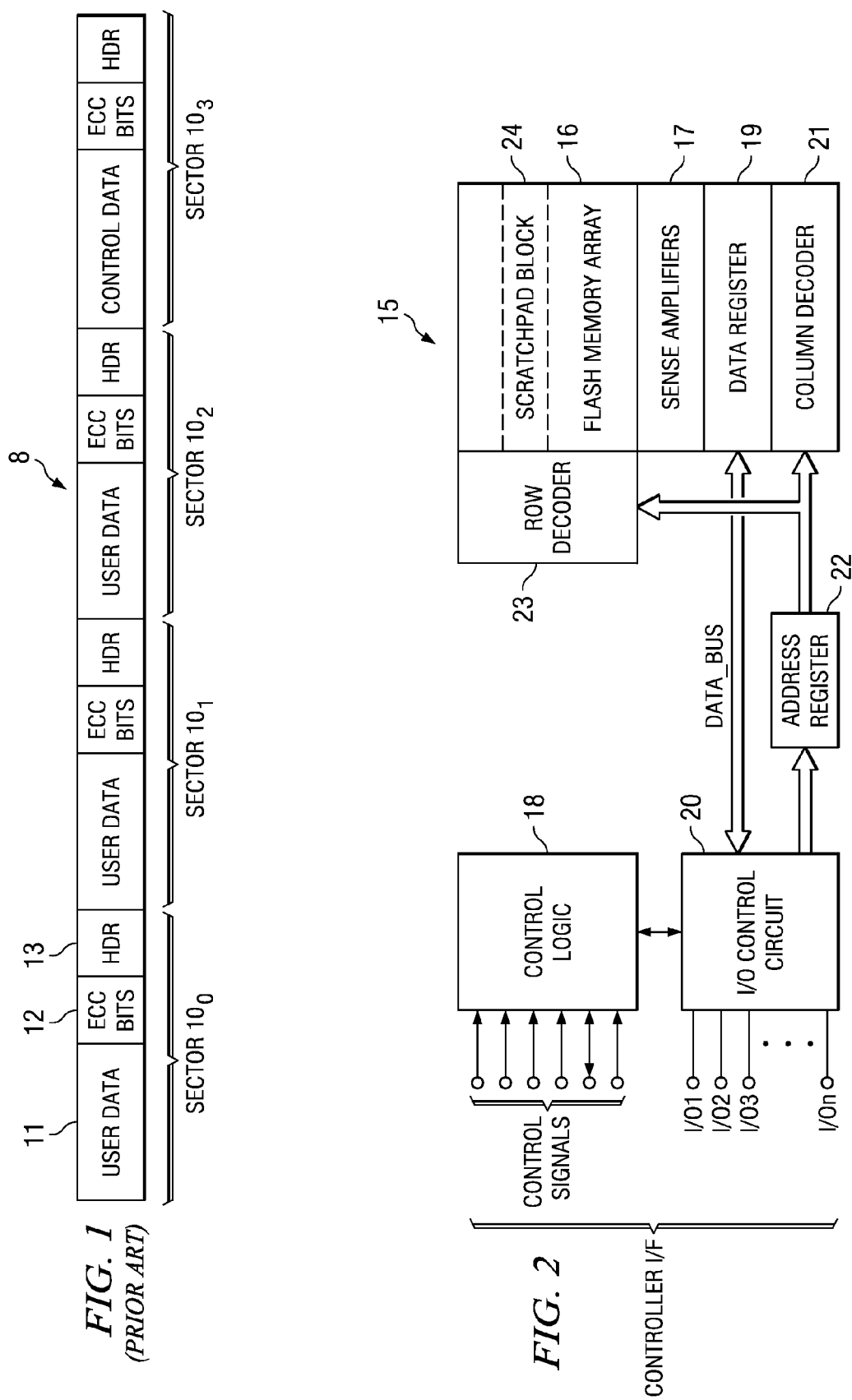
FIG. 1 is a block diagram illustrating the conventional arrangement of a page of data in a conventional flash memory device.
FIG. 2 is an electrical diagram, in block form, of a memory module constructed according to the preferred embodiment of the invention.

Referring now to FIG. 2, the construction of flash memory module 15 according to the preferred embodiment of the invention will now be described in detail. FIG. 2 illustrates an exemplary construction of flash memory device (or module) 10 constructed according to a preferred embodiment of the invention. It is contemplated that flash memory device 15 will typically be constructed into a single integrated circuit, and as such may be interfaced with any one of a number of memory controllers or memory controller logic, as will be described in further detail below. It is also contemplated that the architecture of flash memory device 15 illustrated in FIG. 2 is merely an example presented for purposes of comprehending this invention, and that those skilled in the art having reference to this specification can readily realize this invention in connection with flash memory devices of architectures varying from that shown in FIG. 2.

The storage capability of flash memory device 15 resides in flash memory array 16. Array 16 includes electrically programmable and erasable memory cells arranged in rows and columns, as known in the art. While a single array 16 is shown in FIG. 2, it is of course contemplated that array 16 may be realized as multiple sub-arrays, each having a separate instance of peripheral circuitry, such as part or all of the address, data, or control circuitry described in further detail below relative to the example of FIG. 2. It is contemplated that those skilled in the art having reference to this specification will be readily able to realize this invention in connection with such multiple sub-array architectures. In this example, the memory cells of array 16 are floating-gate metal-oxide-semiconductor (MOS) transistors, constructed so that each such transistor, corresponding to one memory cell, can be electrically programmed and also electrically erased. According to the preferred embodiment of the invention, the memory cells of array 16 are multi-level cells (MLC), in that they may be programmed to more than two data states (i.e., to any of more than two threshold voltages), so that each such cell stores a multiple-bit digital value. Also according to this preferred embodiment of the invention, as will be evident from the following description, these memory cells are preferably arranged in the well-known NAND fashion, such that the cells are typically not randomly accessed but are rather accessed serially, as useful for mass storage applications. Of course, this invention may also be used in connection with binary memory cells (i.e., storing only a single digital bit), and in connection with NOR arrangements of the memory cells.

According to this preferred embodiment of the invention, common input/output terminals I/O1 through I/On are provided, and connected to input/output control circuit 20. As known in the art for NAND type flash memories, the operation of flash memory device 15 is controlled in large part by the receipt and execution of commands, communicated as digital words over input/output terminals I/O1 through I/On, and executed by control logic 18. As such, input/output control circuit 20 receives control commands, address values, and input data, and presents status information and output data, via its driver and receiver circuitry that communicate with input/output terminals I/O1 through I/On. It is contemplated that the number n of input/output terminals I/O1 through I/On will generally be eight or sixteen, although, of course, any number of such terminals may be provided.

Commands received via input/output control circuit 20 are forwarded to control logic 18 for decoding and execution, thus controlling the operation of flash memory device 15. Address values received at input/output terminals I/O1 through I/On by input/output control circuit 20 are buffered in address register 22; the row portion of such addresses is decoded by row decoder 23 and the column portion is decoded by column decoder 21 (each of which typically includes an address buffer), to effect selection of the desired cell or cells in array 16 in the conventional manner. Input/output control circuit 20 is also in bidirectional communication with data register 19, via bus DATA_BUS, to forward data to be written to data register 19, and to receive output data from data register 19, depending upon the direction of the data transfer to be executed. Control logic 18 also receives various direct control signals from external to flash memory device 15, such signals including, by way of example, chip enable, command latch enable, address latch enable, write and read enable signals. As known in the art, the command latch enable and address latch enable signals indicate whether a command or address is being presented on input/output terminals I/O1 through I/On, while the write enable and read enable signals serve as the data strobes in write and read operations, respectively.

According to the preferred embodiment of the invention, memory array 16 is arranged into blocks; a block corresponds to the smallest group of cells that can be erased by an erase operation. Each block, according to this construction, includes multiple pages; a page corresponds to the smallest group of cells that can be programmed by a program, or write, operation. As discussed above, for the NAND organization of memory array 16 according to this preferred embodiment of the invention, a page of memory cells is defined by those cells of array 16 that share the same word line, and a block is defined by those pages that reside in the same "NAND" chain. It is contemplated that the size of memory array 16 according to this preferred embodiment of the invention is relatively large, by modern standards, so that each page corresponds to multiple "sectors" of data. For example, it is contemplated that each page of memory array 16 corresponds to at least four sectors, with each sector corresponding to 512 bytes of actual data and on the order of sixteen bytes of overhead and ECC data. In this example, it is also contemplated that each block will include on the order of thirty-two pages, such that the NAND chains in memory array 16 include thirty-two or more memory cells. Of course, other sector, page, and block sizes may alternatively be realized by memory array 16, within the scope of this invention.

Also according to this preferred embodiment of the invention, one of the blocks of memory array 16 is designated as "scratchpad" block 24. The specific block within memory array 16 that is scratchpad block 24 is arbitrary, and according to this embodiment of the invention, will change during the operation of flash memory module 15. Scratchpad block 24, as will be described in further detail below, serves as temporary storage of sector data to be written to an eventual block of memory array 16, in effect as a non-volatile buffer, considering that partial page programming is prohibited in flash memory array 16 according to this preferred embodiment of the invention.

Figure 3:
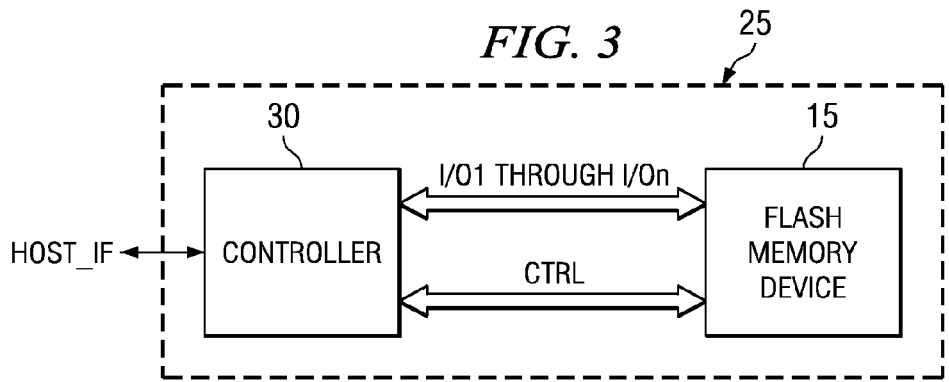
FIG. 3 is an electrical diagram, in block form, of a flash memory card constructed according to the preferred embodiment of the invention.

FIG. 3 illustrates an implementation of flash memory device (or module) 15 implemented into flash memory card 25, according to a preferred embodiment of the invention. As shown in FIG. 3, flash memory card 25 includes at least flash memory device 15 itself and also controller 30. While FIG. 3 illustrates a single flash memory device 15 having a single memory array 16 as described above, it is contemplated that flash memory card 25 may include one or more modules 15 having multiple memory arrays 16, such multiple arrays defining multiple "planes", as known in the art. For the sake of clarity, this description will refer to a single memory array 16 in single flash memory module 15; it is contemplated, however, that those skilled in the art having reference to this specification will be able to readily apply this invention to architectures involving multiple flash memory planes.

Controller 30 provides and manages an external interface HOST_IF to a host system, such as a personal computer or notebook computer, a high-performance digital camera, an automobile sound system, or a portable device such as a digital audio player, personal digital assistant (PDA), cellular telephone handset or another data communication device, and the like. Interface HOST_IF may also correspond to a set of external terminals of flash memory card 25 constructed as a general purpose flash memory card that may be inserted into any one of a wide range of host systems, as known in the art. It is contemplated that interface HOST_IF may operate according to a conventional standard interface as known in the art currently, or as may be developed in connection with future flash memory interface standards or proprietary interface protocols.

As known in the art, some types of flash memory cards or devices do not include a controller, such as controller 30, in which case the host system controls operation of the memory array, for example by executing control software within the host system. Examples of this type of memory system include SMART MEDIA cards and xD cards. While the example of FIG. 3 is directed to flash memory card 25, which includes controller 30, it is contemplated that this invention will also be useful in connection with such controller-less flash memory cards.

As shown in the example of FIG. 3, flash memory device 15 is coupled to controller 30 in a manner consistent with the terminals shown in FIG. 2. In this regard, an input/output bus is formed by signal lines I/O1 through I/On, which connect to terminals of flash memory device 15 of the same name. A control bus CTRL couples controller 30 to flash memory device 15, and includes conductor lines for the control signals discussed above relative to FIG. 2.

Figure 4:
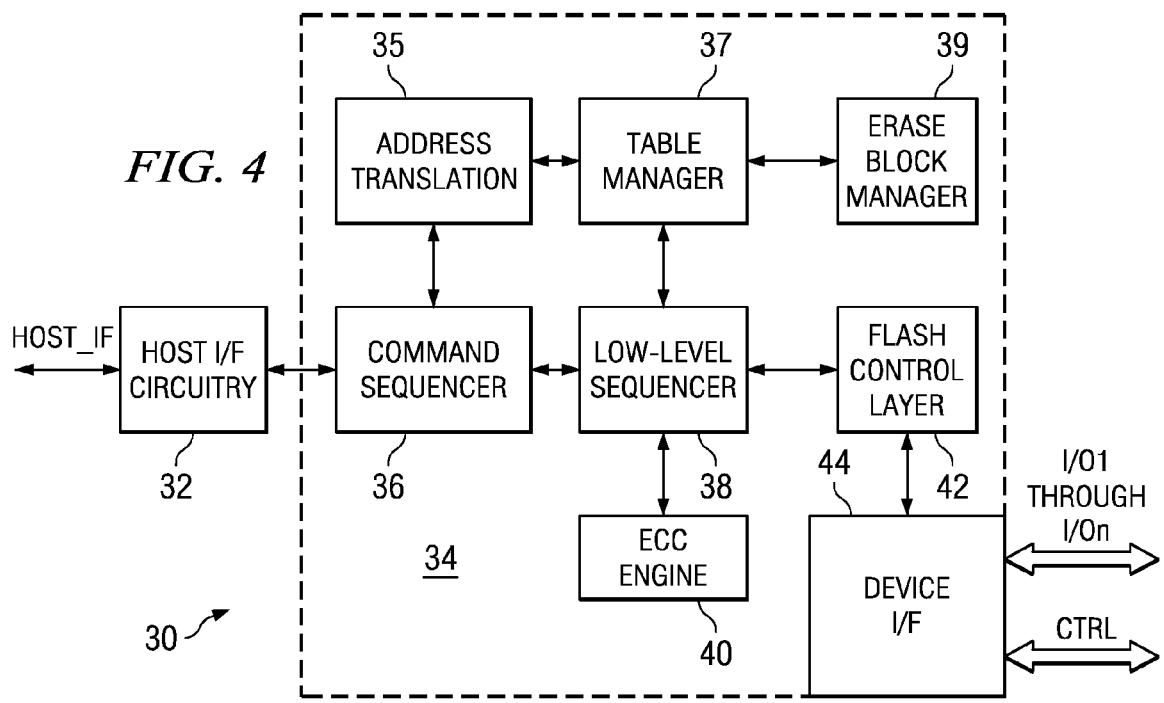
FIG. 4 is a functional diagram, in block form, illustrating the functional architecture of the controller in the flash memory card of FIG. 3, according to the preferred embodiment of the invention.

It is contemplated that controller 30 will be constructed substantially according to conventional flash memory controller architectures, as known in the art, modified as necessary to effect the operations described in this specification. More specifically, FIG. 4 illustrates the functional architecture of controller 30, according to the preferred embodiment of the invention. In this regard, it is also contemplated that the logic hardware, program instructions, or combination thereof for implementing these advanced operating mode functions within controller 30 will be apparent to those skilled in the art having reference to this specification. From a hardware standpoint, as mentioned above, it is contemplated that controller 30 will be constructed in the conventional manner, preferably by way of a programmable processor executing instructions sequences stored in program memory. As such, it is further contemplated that those skilled readers will be readily able to implement such modifications of controller 30, as appropriate for a particular realization, without undue experimentation.

As shown in FIG. 4, controller 30 includes a "front end" system illustrated as host interface circuitry 32, which controls the communication of signals and data to and from the host system over interface HOST_IF, and to and from "back end" system 34, which communicates with flash memory module 15 (FIG. 3). Back end system 34 includes dataflow and sequencing functions that control the sequencing and transfer of sectors of data to and from flash memory module 15, and also media management functions that organize the logical data storage within the block and page structure of flash memory module 15. The dataflow and sequencing functions include command sequencer 36, low-level sequencer 38, and flash control layer 42, while the media management functions include address translation function 35, table manager 37, and erase block manager 39. Command sequencer 36 operates in combination with address translation function 35 to arrange and sequence the transfer of data between the host and flash memory device 15, according to the mapping of logical sector addresses to physical addresses (as translated by address translation function 35). Low-level sequencer function 38 produces the lower level control sequences for communication with flash memory module 15, in combination with table manager 37 which maintains the control table information for flash memory module 15, such tables including free block tables, indices and tables used in maintaining the obsolete or updated status of blocks within flash memory array 16, and the like. Erase block manager function 39 maintains the erased blocks, including maintaining erase count and wear leveling for flash memory module 15. Flash control layer 42 derives and translates the appropriate signal sequences for communication with flash memory module 15, and is in communication with device interface 44 which drives and receives the control and input/output signals to and from flash memory module 15, over input/output lines I/O1 through I/On, and control bus CTRL as shown.

According to the preferred embodiment of the invention, back end system 34 of controller 30 also includes error correction coding (ECC) engine 40, which operates in combination with low-level sequencer 38, or other functions within the dataflow and sequencing functions of back-end system 34, to perform the appropriate encoding and decoding of code bits for storage in, and retrieved from, flash memory module 15. The particular ECC code used by ECC engine 40 can be any one of the known error correcting codes known in the art, and is preferably a code having a code rate that is suitable for use in connection with flash memory storage (i.e., a code that is sufficiently robust to correct a reasonable number of errors, but without requiring an excessive number of additional storage cells in memory array 16). Examples of suitable codes include the well-known Reed-Solomon code, and other BCH codes; in any event, it is preferred that the ECC code is systematic.

The manner in which ECC engine 40 encodes and decodes groups (i.e., sectors) of data according to the preferred embodiment of the invention will be described in further detail below. For purposes of this description, however, it will be first useful to describe examples of the operation of writing data to flash memory array 16, using scratchpad block 24 of FIG. 2.

As mentioned above, it is desired that partial page programming be prohibited for the writing of data to flash memory device 15, to reduce the stress on memory cells in a page of array 16 from the repeated programming of cells in that same page that occurs by writing data using separate programming cycles for each sector within the page. However, as mentioned above, the physical page boundaries are transparent to the host system, which manages data on a sector-by-sector basis. As such, the host system communicates data to and from controller 30 by sectors, without regard to physical page boundaries. Referring now to FIGS. 5a through 5f, the operation of controller 30 and flash memory module 15 in handling sector write operations according to the preferred embodiment of the invention will now be described in detail.

FIGS. 5a through 5d illustrate the operation of controller 30 and flash memory device 15 in using scratchpad block 24. As shown in FIG. 2, scratchpad block 24 refers to a block of arbitrary position within flash memory array 16, such arbitrary positions changing during the operation of flash memory device 15. For example, as one block serving as scratchpad block 24 becomes full (i.e., its last page is written to), the contents of that block are written to a new block that then serves as scratchpad block 24, with obsolete sectors (i.e., those sectors that have been written to another, "update", block or that have otherwise been superseded) discarded so that additional room exists in the new scratchpad block. The block previously serving as scratchpad block 24 is then erased, and available for use. Examples of the construction and operation of scratchpad blocks, as may be used in connection with this invention, are provided in copending and commonly assigned U.S. patent application Ser. No. 11/016,285, filed Dec. 16, 2004 and entitled "Scratch Pad Block", and Ser. No. 11/192,220, filed Jul. 27, 2005 and entitled "Non-Volatile Memory and Method with Multi-Stream Update Tracking", both incorporated herein by this reference.

Figure 5A:
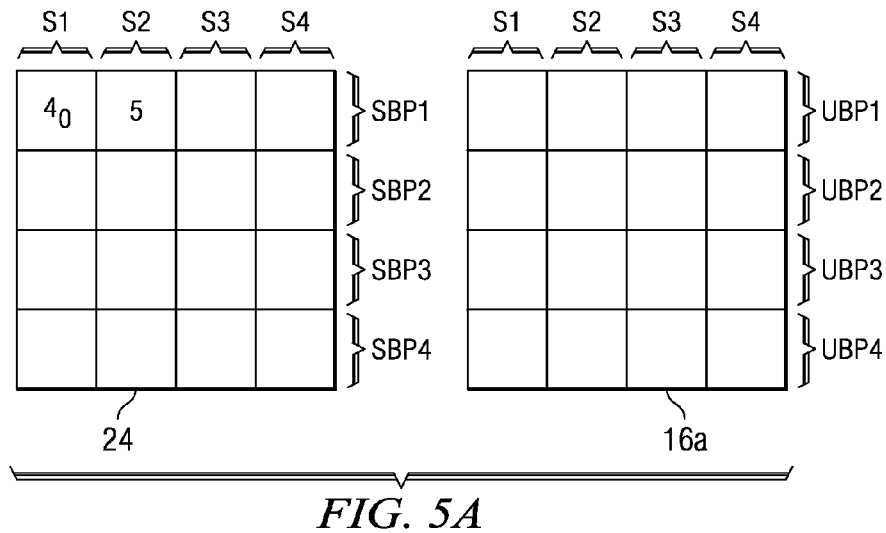
FIGS. 5a through 5f are memory map diagrams illustrating examples of the management of scratchpad and update blocks in a flash memory, according to the preferred embodiment of the invention.

In FIG. 5a, a portion of an instance of scratchpad block 24 is shown. As discussed above, blocks in memory array 16 are arranged into pages, and pages are arranged into sectors. Individual pages SBP1, SBP2, SBP3, SBP4, etc. of scratchpad block 24 each contain multiple sector positions S1, S2, S3, S4 in this example. Of course, as mentioned above, the number of sectors that may be stored within a page and the number of pages within a block depend on the particular architecture. For example, typical modern NAND flash memory arrays are organized to include as many as sixty-four physical pages within a given block. FIG. 5a also illustrates another block 16a of memory array 16, which will be used as a normal "update" block in this example. The term "update" block refers to a block in memory array 16 that is the destination of the data presented by the host system for storage in flash memory device 15. The particular selection and arrangement of update block 16a will depend on the particular organization and management approach for the flash memory, and as such update block 16a may be selected and managed as a sequential update block (i.e., in sequence within memory array 16), or as a "chaotic" update block (i.e., selected non-sequentially within memory array 16). In any event, update block 16a includes multiple pages, four such blocks UBP 1 through UBP4 shown in FIG. 5a, with each block UBPj including four sector positions S1 through S4. Of course, update block 16a will typically include the same number of pages, and sectors per page, as scratchpad block 24, considering that any block (including update block 16a) may itself be designated as scratchpad block 24 over time.

FIG. 5a illustrates the contents of scratchpad block 24 and update block 16a, in response to controller 30 receiving a sector's worth of data to be written. In this example, data for a single sector #5 (such data including its corresponding header information) is received by controller 30 from the host. For the sake of clarity, the description of this operation of the preferred embodiment of the invention will refer to "data" as including the actual payload data and also any header information (e.g., as shown in FIG. 1). As discussed above, partial page programming is prohibited in flash memory device 15. However, the data received from the host in this first operation is data for only one sector, and for a sector that is not aligned with the beginning of a page. Rather, in this example in which four sectors are provided per page, sectors #0, #4, #8, #12, etc. are aligned with page boundaries. Accordingly, controller 30 stores the contents for sector #5 in page SBP1 of scratchpad block 24, "padding" the written data with a copy of the current contents of sector #4 (shown as data $4_0$ in FIG. 5a). As a result of this operation, page SBP1 contains the data for sectors #4 and #5, and because partial page programming is prohibited, this page SBP1 will not be written to again until after erasure of scratchpad block 24. Update block 16a remains empty at this point.

According to the preferred embodiment of the invention, as will be described in further detail below, page SBP 1 is written to store the contents of sectors #4 and #5, together with their management and error correction code bits, in a manner that provides improved error correction capability relative to conventional flash memory write and read operations. The arrangement of the actual stored data and the overhead will be described below in detail, in connection with FIG. 6a.

Figure 5B:
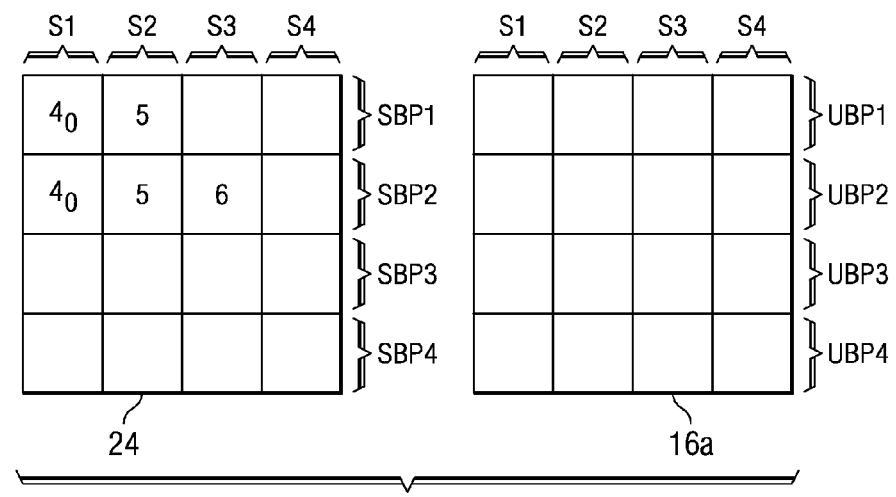
Figure 5C:
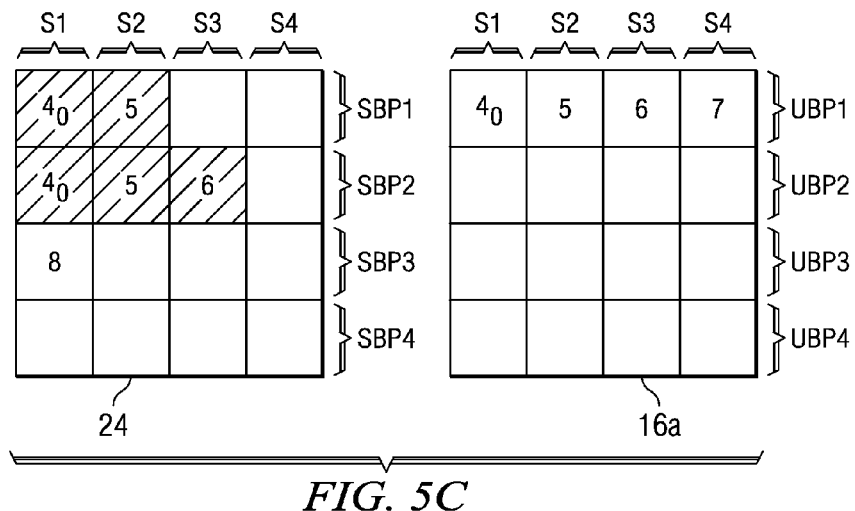

FIG. 5b shows the contents of scratchpad block 24 and sequential block 16a after controller 30 has received, from the host system, the contents for a next sector #6 to be written to flash memory device 15. As before, these data for sector #6 do not fill a page, and are not aligned with a page boundary. If partial page programming were permitted, controller 30 could have merely written these data for sector #6 into a neighboring sector S3 of page SBP 1 (or, more likely, merely directly written sector #6 to the appropriate physical sector of flash memory array 16, without use of a scratchpad block 24). As shown in FIG. 5b according to this embodiment of the invention, however, controller 30 writes sector #6 to sector position S3 of a new page SBP2, padded with the contents of sectors #4, #5 that were previously written to, and remain in, page SBP1 of scratchpad block 24. Update block 16a has not yet been written to at this point.

According to this example, controller 30 next receives data for two sectors #7 and #8. The data for sector #7 would, of course, complete a full page of data containing also sectors #4, #5, and #6; the data for sector #8 constitutes the first sector of data for another page. In this approach, a full page of data for sectors #4, #5, #6, and #7 are thus written to page UBP 1 of update block 16a (the data for sector #4 being a copy of previous contents $4_0$, padded to the new data for sectors #5, #6, #7 as mentioned above). Controller 30 marks the contents of pages SBP1, SBP2 of scratchpad block 24 as obsolete, because these contents are now stored in update block 16a. This marking may be effected, for example, by operating table manager function 37 to write corresponding control data to a table or other data structure stored in controller 30 or in flash memory device 15. Sector #8, which corresponds to the partial contents of a different page is written to page SBP3 of scratchpad block 24. Because sector #8 is aligned with a page boundary and because it will not be written to update block 16a until data for at least one subsequent sector is received, no padding is required.

Figure 5D:
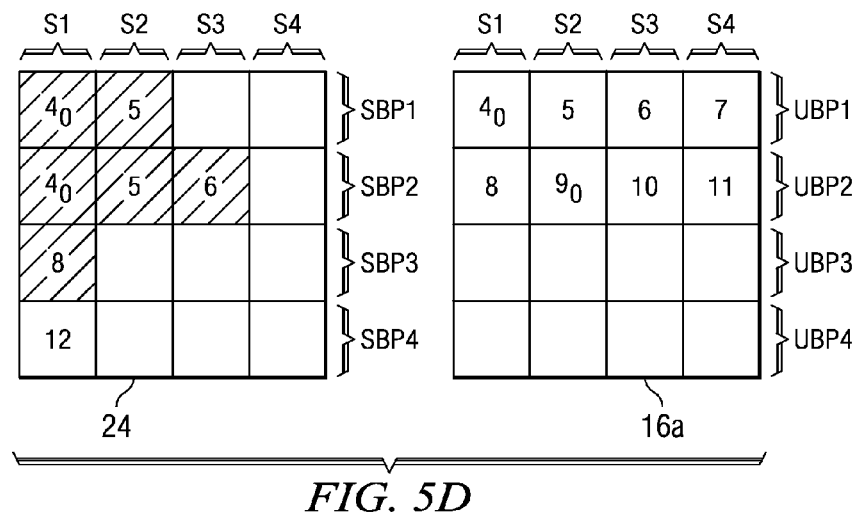

FIG. 5d represents the receipt, by controller 30, of three sectors' worth of data from the host system, namely the data for sectors #10, #11, and #12. Because the data for sectors #10 and #11 are to reside in the same page as that data for sector #8, and because sector #11 is the last sector within the boundaries of a page, controller 30 writes a full page of data to page UBP2 of update block 16a, including data for sectors #8, #9, #10, #11. Padding is provided by a copy of the previous contents of sector #9 (such padding shown by sector data 90 in FIG. 5d), to fill page UBP2. In scratchpad block 24, the contents of sector 8 are marked as obsolete, and the third received sector #12 is written to a next page SBP4 of scratchpad block 24 as shown.

According to the preferred embodiment of the invention, controller 30 operates to use available sector space in scratchpad block 24 to store both user data (i.e., data generated by execution of an application on the host system) and control or support data within a single page. According to this invention, examples of this control or support data (which will be referred to in this specification as "control" data) include index information for scratchpad block 24 itself. For example, such scratchpad block index information includes logical block addresses for the contents of scratchpad block 24, the number of valid sectors currently stored in scratchpad block 24, indices of the sector offset of the first valid sector in an active scratchpad page, a pointer to the next page of scratchpad block 24 that can accept new data, and the like. Other examples of control data include logical and physical block address tables and information, indices, pointers, and offsets for other data structures in flash memory device 15, tables and other information concerning wear leveling operations for blocks in flash memory array 16 (e.g., erase counts for each of the blocks, least-and most-frequently erased block tables, etc.), and other control and support information used in the operation and management of flash memory device 15. And as will be described in detail below, this control data also includes an update block pointer value, which points to the physical page in update block 16a that is to receive the next page of host data to be written; according to the preferred embodiment of this invention, this update block pointer is useful in managing the latest version of sector data, for example as described in commonly assigned copending application Ser. No. 11/192,220, filed Jul. 27, 2005 and entitled "Non-Volatile Memory and Method with Multi-Stream Update Tracking", and incorporated herein by reference. In general, and also specifically with reference to scratchpad block index information, this control data can include information that is synchronous with the user data contents of the other sectors currently active and to be stored in scratchpad block 24, and information that is not synchronous or otherwise concerned with such user data and as such that need not be written at the same time or coherently with the user data.

Figure 5E:
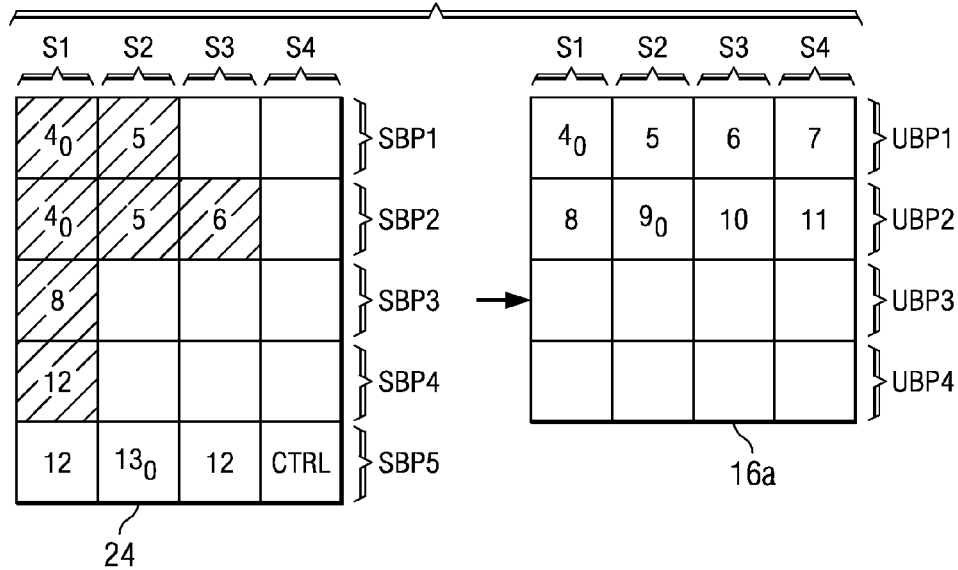

Referring to FIG. 5e, controller 30 has received new data for sector 14 from the host system, after having written the contents of sector 12 to page SBP4 (FIG. 5d). According to this embodiment of the invention, controller 30 determines that an additional sector (sector position S4) would be available in page SBP4 even after writing the newly received sector #12 contents. Controller 30 writes to a new page SBP5, in scratchpad block 24, the previously received contents for sector 12 into sector position S1 of page SBP5, and the newly received data for sector 14 into sector position S3; sector position S2 is "padded" with previously stored contents of sector 13$_0$, and sector position S4 of page SBP5 receives control data CTRL to fill page SBP5. In this example, control data CTRL includes an update block pointer, having a value pointing to the address value for page UBP3 in update block 16a, this page UBP3 being the next erased page in update block 16a. While page SBP5 is shown as filled (i.e., all four sector positions S1 through S4 contain stored data), the inclusion of control data CTRL into a page of scratchpad block 24 need not necessarily fill a page. For example, referring back to FIG. 5a, control information CTRL may have been written to sector position S3 of page SBP1 if desired.

According to this embodiment of the invention, as mentioned above, the inclusion of control information CTRL into a page of scratchpad block 24 is performed in a manner that provides improved error detection and correction capability, relative to conventional ECC techniques. The contents of page SBP5 of scratchpad block 24 in the state shown in FIG. 5e, as arranged according to the preferred embodiment of the invention, will now be described in detail relative to FIG. 6a.

Figure 6A:
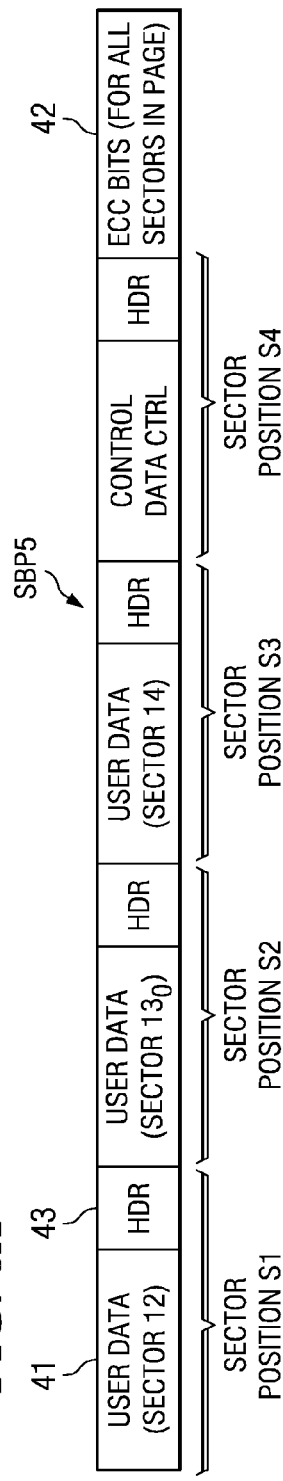
FIGS. 6a and 6b are diagrams illustrating the arrangement of pages of data arranged according to the preferred embodiment of the invention.

FIG. 6a illustrates sector position S1 storing the user data for sector #12 in a portion 41, and the header for that sector #12 data in a portion 43. Similarly, sector position S2 stores the user data for sector #13 (i.e., sector data 13$_0$) and its header, and sector position S3 stores the user data for sector #14 and its header. Sector position S4 of page SBP5 stores the control data CTRL, and its header information. However, none of sector positions S1 through S4 store error correction coding (ECC) bits for their respective user data. Rather, portion 42 of page SBP5 of scratchpad block 24 stores the ECC bits that have been calculated or derived for all sectors in the page.

According to the preferred embodiment of the invention, the ECC bits stored in portion 42 of page SBP5 are not a concatenation of the ECC bits calculated for the individual sector user data (and control data portions). Rather, the ECC bits stored in portion 42 are encoded considering the user (and control) data portions of all sector positions S1 through S4 as a whole. In other words, with reference to the example of FIG. 6a, the ECC bits in portion 42 are encoded from a large data block containing the user data for sectors 12, 13$_0$, 14 and control data CTRL. In fact, these ECC bits of portion 42 need not be stored contiguously in page SBP5, but may be distributed throughout the page if desired. According to this invention, the ECC bits, however stored within the page, are encoded from the large multiple-sector data block taken as a whole.

It has been discovered, in connection with this invention, that the encoding of multiple sectors' data in a single data block requires fewer ECC bits to correct a given number of randomly distributed errors over the multiple-sector page, than would be required for the same level of error correction if each sector is individually encoded. This property of this preferred embodiment of the invention may be illustrated by way of examples. For the sake of clarity, these examples will refer to data sectors of sizes (e.g., 512 bytes) that are powers of two; in practice, as described above, sectors will have a data portion of a size that is typically a power of two (e.g., 512 bytes) with additional bytes provided (e.g., six bytes) for a header.

According to the well-known BCH code, for any integers $m \geq 3$ and $t < 2^{m-1}$, there is a binary BCH code with a block length of $n = 2^{m}-1$ that includes k digits of payload data, and that thus includes n−k parity-check (ECC) digits, wherein n−k$\leq$mt. The minimum coding "distance" $d_{min}$ of such a code is $d_{min} > 2t+1$; this code can detect up to $d_{min}$ errors in the n digit code word, and can correct up to t errors.

For a sector size of 512 bytes (4096 bits) of actual data, a convenient example of a BCH code can be arranged with m=13 and t=4. This code requires n−k=mt=13×4=52 ECC bits, at a minimum. Additional ECC bits are often provided in conventional applications of sector-wise ECC coding using such a BCH code; for example, a common implementation defines the number of ECC bits as n−k=m(t+1)+1, or 66 bits for 4096 bits of payload data with m=13 and t=4. This will correct up to t=4 errored bits within the codeword corresponding to the 4096 bit sector and its ECC bits (e.g., the 66 ECC bits).

According to the preferred embodiment of the invention, however, multiple sectors of data are encoded into a single data block, regardless of the type of data contained within each sector, and despite the sectors typically being individually accessed by the controller. The number t of random errors to be corrected can remain constant with this increase of the data block size, because the programming operation applied to flash memory device 15 is a page-wise operation, as described above. It is the number of random correctable errors per page, i.e., per programming operation, that determines the successful completion of the programming operation. As an aside, non-random (i.e, clustered) errors that number more than the correctable limit t are not correctable either on a sector-by-sector basis or on a page-by-page basis (i.e., for t=4, five errors in a sector would not be correctable in either case). As such, this invention holds constant the number of randomly distributed bit errors over the page.

For the example of a four-sector page of data, where each sector has a size of 4096 bits (512 bytes), the block length to be encoded is n=16384 bits. This requires the parameter m to be at least 15 (n=$2^{m-1}$). As discussed above, the number t of correctable errors can remain at t=4, even with the data block size quadrupling in this example. As a result, the minimum number of ECC bits defined by n−k=mt is 60 bits, in this case. Preferably, additional ECC bits are provided, for example n−k=m(t+1)+1, as discussed above; in this case, for t=4 and m=15, 76 ECC bits would be provided. Either of these cases would require substantially fewer memory cells for the storing of ECC bits than the conventional approach, in which four sets of 66 ECC bits (one for each sector) are required, amounting to 264 ECC bits over the page, with no reduction in random error correction.

Alternatively, the number of correctable errors t can be increased according to this invention, by increasing both the data block size n and the number of ECC bits n−k. In other words, for the same number of ECC bits per page as in the conventional sector-by-sector arrangement (e.g., using 264=4×66 ECC bits, for a four-sector page) but by encoding the multiple-sector page as a single data block, the number t of correctable bits over the page can be substantially increased (e.g., to t=19 in this example).

As mentioned above, Reed-Solomon codes are a subset of BCH codes that are also commonly used for error correction. According to Reed-Solomon coding, the ECC bits are arranged as multiple-bit "symbols", each of which have a size of m bits, where block length n=$2^{m-1}$ symbols. The number of ECC or parity-check symbols n-k is defined by n-k≦2t, t being the number of correctable errors, with a minimum coding distance $d_{min}$=2t+1. For the example of four 512-byte sectors in a physical page and thus m=9, a useful Reed-Solomon code for t=4 would require eight ECC symbols, of m=9 bits each per sector; this results in a total number of 72 ECC bits per sector, and 288 bits total for a four-sector page, according to the conventional sector-wise error correction approach.

According to this invention, however, increasing the size of the codeword to include all of the sectors within the page can greatly reduce the number of ECC symbols (and bits) for the same random error correction performance. For example, forming a single code block from four 512-byte sectors in a page (i.e., a code block of 2048 bytes) requires an m=11 Reed-Solomon codeword. Keeping the number of correctable errors t constant at t=4 thus results in eight ECC symbols of m=11 bits each (88 ECC bits total), over the entire page, which is much smaller than the 288 ECC bits required for error correction applied on a sector-by-sector basis, in the conventional manner.

Again, a higher error correction level (e.g., t>4) can be provided according to this invention, by using the same number of, or even fewer, ECC bits over the page than the number required for sector-by-sector comparison. For example, for an m=11 Reed-Solomon codeword that is implemented using 288 ECC bits, the number t of correctable errors may be as high as t=13. It is contemplated that those skilled in the art having reference to this specification can readily optimize the level of error correction with the desired number of ECC bits or symbols, for a particular implementation of this invention.

Figure 5F:
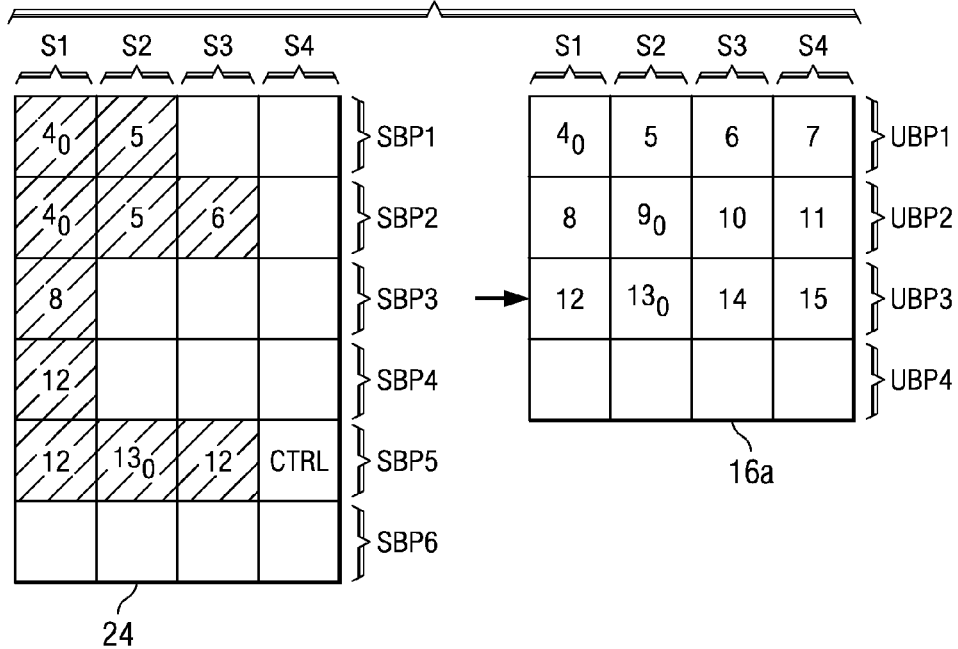

Referring back to FIG. 5e, page SBP5 in scratchpad block 24 is written with the user and control data, their respective headers, and the corresponding ECC bits, as described above relative to FIG. 6a in this example. Upon the host system then presenting user data for sector #15 to controller 30, a full page of user data then becomes available (i.e., user data for sectors #12, #13, #14, and #15). Controller 30 then writes a full page to update block 16a, specifically to update block page UBP3 as shown in FIG. 5f, as indicated by the current value of the update block pointer as stored in control data CTRL in scratchpad block 24.

Figure 6B:
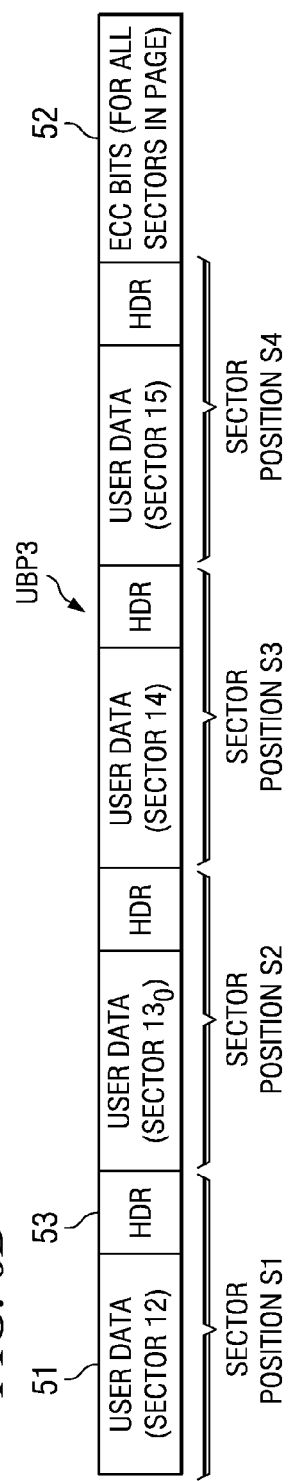

According to this embodiment of the invention, the error correction coding applied in writes to update block 16a is also performed over all sectors, as a single data block for coding purposes, rather than on a sector-by-sector basis as in the conventional manner. FIG. 6b illustrates the arrangement of page UBP3 in update block 16a, according to this embodiment of the invention. Similarly as in the scratchpad page SBP5 of FIG. 6a, each sector position S1 through S4 includes a user data portion 51 and a header portion 53. Update block page UBP3 also includes a single ECC bit portion 52, however, which stores the ECC bits encoded over all sectors in page UBP3, taking the user data for those sectors as a single data block for coding purposes. In this example, the contents of header portions 53 for each sector are not encoded, although this additional information may also be included as "data bits" in the error correction coding if desired. As described above relative to this approach as applied to scratchpad block 24, this preferred embodiment of the invention provides a higher degree of error correction capability for the same number of memory cells per page in memory array 16, or conversely can reduce the number of memory cells required for ECC bits for a given level of error correction.

This error correction coding of pages both in scratchpad block 24 and also in update block 16a, as well as other blocks of memory array 16, also changes the manner in which data are read from memory array 16. In conventional flash memories that apply ECC techniques on a sector-by-sector basis, the read of a sector of data involves the sensing of memory cells corresponding to that sector (perhaps along with other sectors in the rest of the page that share the same word line). The data sensed for this sector includes both the actual user data (or control data, as the case may be) and the ECC bits associated with that actual data, from which ECC decoding (and the correction of errors detected in this decoding) can be carried out for that sector's data, using only that sector data.

In contrast, according to the preferred embodiment of the invention, ECC decoding is performed over an entire page, even if only an individual sector of data is to be read. This is because the ECC bits for the page were encoded over the unitary data block including all sectors in that page; conversely, referring to FIG. 6a, the ECC bits in portion 42 cannot be parsed into ECC bits for each of the sectors in page SBP5. Accordingly, by way of example and referring to FIG. 6a, if the data for sector 14 is to be read from page SBP5 in scratchpad block 24, all data from sector positions S1 through S4 and also the ECC bits from portion 42 are read and decoded, using the entire page as the code word. After this ECC decoding of the entire page, the user data for sector 14 can be retrieved and forwarded to the host system.

As shown in FIG. 5f, sector positions S1 through S3 of scratchpad block page SBP5 are marked as obsolete, following the write of these contents to update block 16a. According to this embodiment of the invention, control data CTRL remains valid in sector position S3, and indeed maintains the same update pointer value as prior to the write to update block page UBP3 (i.e., pointing to update block page UBP3 itself). As described in copending application Ser. No. 11/192,220 incorporated by reference above, this value of the update pointer thus indicates, to controller 30, that the user data for sectors 12, $13_0$, 14 as stored in scratchpad block 24 have been superseded by the write to update block UBP3 (which also includes the user data for sector 15). Control data CTRL, with this update block pointer value and the other control and support information stored therein, remains valid in sector position S4 of page SBP5 so long as no further writes to scratchpad block 24 are required, for example as long as continued host system writes are page-aligned.

Referring now to FIG. 7, in combination with the examples illustrated in FIGS. 5a through 5e, 6a, and 6b, and described above, the operation of controller 30 in writing data to flash memory device 15, by way of managing scratchpad block 24, according to this embodiment of the invention will now be described in a more generalized manner.

In process 60, controller 30 receives one or more sectors of data from the host system, along with the corresponding logical address for the data and the appropriate command or instruction to write that data to flash memory device 15. Controller 30 determines whether the sectors of data received from the host system include a complete page's worth of data (four sectors' data, in this example), in decision 61. If so (decision 61 is YES), ECC engine 40 of controller 30 executes process 62 to encode an error correction coding (ECC) code word over all sectors' data for the page. Because a full page of data is received from the host system, that data will typically correspond to user data (i.e., data generated by an application being executed by the host system). As discussed above, encoding process 62 generates ECC bits, or parity bits, based on a unitary data block corresponding to the data for all sectors within the full page.

In this description, ECC engine 40 of controller 30 performs the encoding (and decoding) operations according to this preferred embodiment of the invention It is of course contemplated that other circuitry in controller 30, or other functions within such a controller according to the particular architecture, may perform these ECC encoding and decoding operations.

Figure 8A:
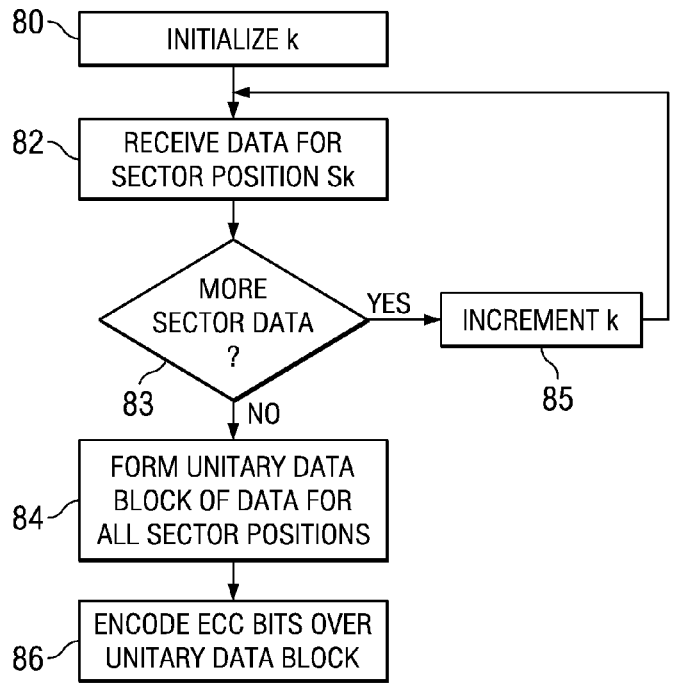
FIGS. 8a and 8b are flow diagrams illustrating the encoding operations involved in writing and reading data, respectively, according to the preferred embodiment of the invention.

FIG. 8a illustrates an example of encoding process 62 according to this preferred embodiment of the invention. A sector index k is initialized, in process 80. ECC engine 40 receives data destined for sector position Sk (k being the index) in process 82. Decision 83 determines whether more sector data remains to be included in the current page; if so (decision 83 is YES), index k is incremented in process 85 and the data for the next sector position Sk is received by ECC engine 40 in another instance of process 82. Upon receiving the data for all sector positions in the page to be written (decision 84 is NO), ECC engine 40 then forms a unitary data block of the user data of all sectors in the page, in process 84. And in process 86, ECC engine 40 encodes ECC bits over this unitary data block, according to the desired code that is implemented in ECC engine 40. As discussed above, it is contemplated that the code used by controller 30 is preferably a systematic code, such that the data bits remain in their original form with the ECC or parity bits appended thereto. Examples of conventional systematic codes useful in connection with this preferred embodiment of the invention include Reed-Solomon codes of the desired code rate and code length, and other BCH codes known in the art.

Referring back to FIG. 7, process 64 is next performed by controller 30 to write a page of data including the ECC bits derived in coding process 62 to a physical page of flash memory device 15. Process 64 includes the arranging of the code word from process 62 along with header information and the like, for example into an arrangement as shown in FIG. 6b and described above. Controller 30, by way of its low-level sequencer function 38, flash control layer 42, and device interface 44, then generates the appropriate control, command, address, and data signals and applies these signals to flash memory device 15, for receipt and programming into an update block or other physical location of flash memory array 15. Control then returns to process 60, for receipt and processing of additional user data to be written.

Referring back to decision 61, if a complete page of data was not received (decision 61 is NO), controller 30 next performs decision 65 to determine whether sectors within the same page boundary as the received sector or sectors are already present in scratchpad block 65. An example of this situation is described above relative to FIG. 5b, in which data for sector #6 is received and in which data for sectors #4 and #5 are already present in scratchpad block page SBP1. If such sectors are already present (decision 65 is YES), the data corresponding to those sectors are retrieved in process 66.

Figure 8B:
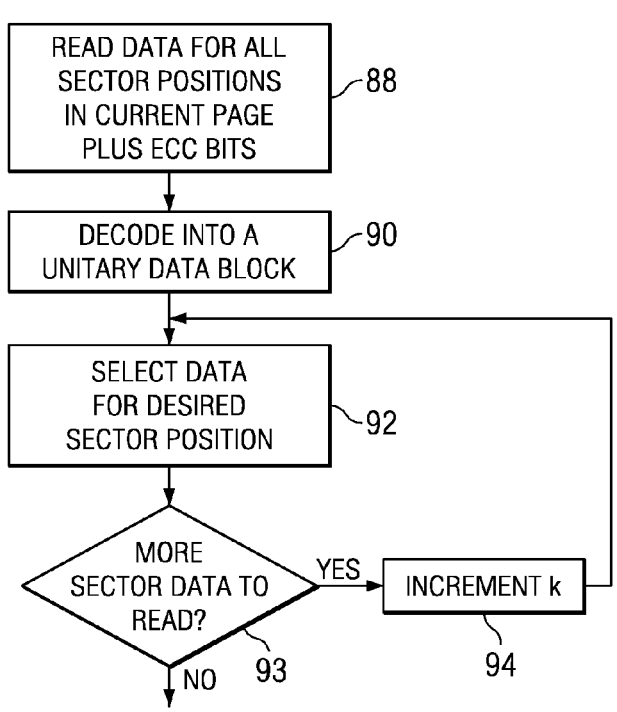

FIG. 8b illustrates the operation of controller 30 in retrieving data from scratchpad block 24 in process 66, according to the preferred embodiment of the invention. This retrieval process also corresponds to the operation of controller 30 in performing a read of sector data from any block of flash memory device 15 according to this preferred embodiment of the invention, insofar as the decoding of a page of data and parsing of sector data from that decoded page is described. As shown in FIG. 8b, process 88 reads the data for all sector positions (sectors SI through S4, in this example) of the page being read, and also its ECC code bits (e.g., from ECC portion 42, 52). In process 90, ECC engine 40 of controller 30 decodes this code word (data plus parity bits) into a unitary data block, such decoding performed in the conventional manner for the code being used. In this decoding process 90, as known in the art, errored bits that have been read from flash memory array 16 are corrected (at least up to the error correction capability of the code). The result of process 90 is a unitary data block of the user data (for example) contained within the page that was read from flash memory array 16. In process 92, controller 30 selects the data corresponding to the desired sector position Sk, in combination with any header data useful in connection with that read, as conventional in the art, and outputs that selected sector of data to the appropriate function in controller 30. If additional sectors remain to be read (decision 93 is YES), index k is incremented to the next sector position, and that sector's data is selected in a next instance of process 92, and again repeated until the desired sector data is retrieved.

Referring back to FIG. 7, if sectors of the same page as the sector received in process 60 are not already present in scratchpad block 24 (decision 65 is NO) or upon retrieval of such sectors as are already present in scratchpad block 24 (process 66), controller 30 determines whether the sector received in process 60 is the last sector within a page boundary. Following the example described above, in which each page contains four sectors at sector positions SI through S4, decision 67 determines whether the received sector corresponds to sector position S4. If so (decision 67 is YES), then a page may be written to an update block in flash memory array 16, as shown by way of example relative to FIG. 5d described above (in which sectors 10 and 11 are received from the host system and written to update block 16a). In this case, controller 30 "pads" the page to be written with previously stored data for any sectors in the same page that are not already in scratchpad block 24, by reading those sectors (e.g., sector 9₀ of FIG. 5d) from flash memory device 15; the reading and decoding of such "pad" sectors is performed in similar fashion as described above relative to FIG. 8b, considering that the multi-sector ECC coding is preferably performed for both scratchpad and update blocks. Once data for all sectors in the page have been retrieved, ECC engine 40 performs process 70 to encode an ECC code word over all sectors of the page to be written, in the manner described above relative to FIG. 8a. This page of data is then written to the appropriate page of an update block in flash memory array 16, in process 64, in the manner described above. Control returns to process 60, as before.

On the other hand, if the sector received from the host system does not correspond to a last sector position in a page (decision 67 is NO), controller 30 then begins the operation of building a page to be written to scratchpad block 24, according to this embodiment of the invention. This is because less than a full page of user data has been received from the host system, while partial page programming of flash memory array 16 is prohibited; as such, scratchpad block 24 is to be utilized to temporarily store a partial page's worth of user data. Controller 30 then determines, in process 71, whether control or support data is available for temporary storage in a sector of a page of scratchpad block 24, along with the partial page of user data received and indicated by decision 67. If so (decision 71 is YES), controller 30 adds a control data sector to that of the received host data, in process 72; an example of such a page of user data and control data is shown in FIG. 5e and described above. If no control data is available or if such control data is already stored and need not be updated (decision 71 is NO), a partial page will be written to scratchpad block 24, for example as shown in FIG. 5*d* and described above.

In either event, intervening sectors are "padded" as necessary into the page to be written to scratchpad block 24, in process 74. In process 76, ECC engine 40 in controller 30 encodes a code word over all sectors of the page to be written to scratchpad block 24. The encoding of process 76 follows the example described above relative to FIG. 8*a*. Within such encoding, control data is included in the same unitary data block as user data, if control data is to be written as shown in FIG. 5*e*. If any sector positions will not contain data (whether or not control data is also included), data corresponding to the unprogrammed "0" state (or "1" state, as the case may be) for those memory cells is preferably included in the data block being encoded, as though such blank data were user data. Following encoding process 76, a page of data is arranged in process 78, for example as shown in FIG. 8*a* if control data is included or as shown in FIG. 8*b* if control data is not included, and is written by controller 30 to the next available page of scratchpad block 24, completing process 78. Control then returns to process 60, for receipt and processing of additional user data in this manner.

According to the preferred embodiment of this invention therefore, the efficiency of error correction coding in the storing of data in a flash memory device is substantially improved. This improved efficiency stems from the ability to encode a larger block of data, covering multiple sectors, and regardless of the nature of the data (i.e., user data, and unrelated control data, are encoded together). This improvement of the efficiency of error correction coding results in a higher number of errored bits that can be corrected within a sector of data, or alternatively enables a reduction in the number of redundant memory cells required within a page of the flash memory array for a given level of error correction. This invention is especially beneficial as it is compatible with flash memory devices in which partial page programming is prohibited, and thus attains the additional reliability effects of that constraint. In addition, this improved error coding is useful both in the storage and retrieval of data from user regions of the flash memory, and also from scratchpad blocks and other system resources. The benefits of this invention are manifest both in the implementation of a flash memory device itself, and also in a flash memory card or other system or subsystem that includes both a flash memory device and also a flash memory controller.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A flash memory system, comprising: a flash memory device, having a plurality of memory cells arranged into pages and blocks, each page having a number of memory cells sufficient to store data for a plurality of sectors, and each block having a plurality of pages; a flash memory controller, coupled to the flash memory device, comprising: a host interface, for interfacing to a host system; a device interface, for interfacing to the flash memory device; and controller circuitry for managing the writing of user data received at the host interface to the flash memory device according to a sequence of operations comprising: receiving user data corresponding to a first plurality of sectors via the host interface; encoding error correction coding (ECC) bits for a unitary data block, the unitary data block comprising the user data corresponding to the first plurality of sectors and control data corresponding to a sector not including user data and not including header data associated with user data, so that the ECC bits are encoded using both the user data and the control data together, wherein the control data comprises data related to operation or management of the flash memory system; programming a first page to store the encoded unitary data block; reading the programmed first page; decoding the read first page, using the ECC bits, to recover the data bits as a unitary data block including the data corresponding to the first plurality of sectors; and retrieving a desired sector of data from the decoded unitary data block.

2. The system of claim 1, wherein the reading step is performed responsive to receiving a read command at the host interface;
and wherein the sequence of operations further comprises:
forwarding the desired sector of data to the host interface.

3. The system of claim 1, wherein the encoding operation encodes ECC bits for the unitary data block comprising the host data, the control data, and a copy of host data previously stored in the flash memory device.

4. The system of claim 1, wherein the control data comprises data of a type selected from the group consisting of logical and physical block address tables for the memory; indices, pointers, and offsets for data structures in the flash memory device; and wear leveling data for the flash memory device.

5. The system of claim 4, wherein the first page is in a scratchpad block of the memory; and
wherein the control data comprises an update block pointer, for pointing to an update block of the memory.

6. The system of claim 1, wherein the first plurality of sectors are associated within a common page boundary;
wherein the retrieving step retrieves the user data for the first plurality of sectors; and further comprising:
receiving data for another sector within the common page boundary of the first plurality of sectors;
encoding error correction coding (ECC) bits for the data corresponding to the first plurality of sectors and the another sector, taken as a unitary data block;
programming a second page of the memory to store the data and the ECC bits, the second page located within the update block.

7. The system of claim 1, wherein the first plurality of sectors are associated within a common page boundary;
wherein the retrieving operation retrieves the user data for the first plurality of sectors; and
further comprising:
receiving data for another sector within the common page boundary of the first plurality of sectors;
encoding error correction coding (ECC) bits for the data corresponding to the first plurality of sectors and the another sector, taken as a unitary data block;
programming a second page of the memory to store the data and the ECC bits.

8. The system of claim 1, wherein the encoding and decoding steps operate according to a Reed-Solomon code.

9. The system of claim 1, wherein the encoding and decoding steps operate according to a BCH code.

10. A method of operating a non-volatile solid-state memory, the memory arranged in pages of memory cells, each page corresponding to a group of the memory cells that are programmable in an individual programming operation, the method comprising the steps of: receiving user data corresponding to a first plurality of sectors from a host, each sector corresponding to a quantity of data so that a page of the memory has the capacity to store the data for the plurality of sectors, wherein the user data comprises data generated by a user of, or an application on, the host; encoding error correction coding (ECC) bits for a unitary data block, the unitary data block comprising the user data corresponding to the first plurality of sectors and control data corresponding to a sector not including user data and not including header data associated with user data, so that the ECC bits are encoded using both the user data and the control data together, wherein the control data comprises data related to operation or management of the memory; programming a first page of the memory to store the encoded unitary data block; reading the programmed first page of the memory; decoding the read first page, using the ECC bits, to recover the data bits of the unitary data block including the user data corresponding to the plurality of sectors; and retrieving a desired sector of data from the decoded unitary data block.

11. The method of claim 10, wherein the control data comprises data of a type selected from the group consisting of logical and physical block address tables for the memory; indices, pointers, and offsets for data structures in the memory; and wear leveling data for the memory.

12. The method of claim 10, wherein the encoding step encodes ECC bits for the unitary data block comprising user data, a copy of user data previously stored in the memory, and control data.

13. The method of claim 10, wherein the memory is arranged in blocks, each block including a plurality of pages, and each block corresponding to a plurality of cells that are erasable in an erase operation;
   wherein the first page is in a scratchpad block of the memory; and
   wherein the control data comprises an update block pointer, for pointing to an update block of the memory.

14. The method of claim 13, wherein the first plurality of sectors are associated within a common page boundary;
   wherein the retrieving step retrieves the user data for the first plurality of sectors; and
   further comprising:
      receiving data for another sector within the common page boundary of the first plurality of sectors;
      encoding error correction coding (ECC) bits for the data corresponding to the first plurality of sectors and the another sector, taken as a unitary data block;
      programming a second page of the memory to store the data and the ECC bits, the second page located within the update block.

15. The method of claim 10, wherein the first plurality of sectors are associated within a common page boundary;
   wherein the retrieving step retrieves the user data for the first plurality of sectors; and further comprising:
   receiving data for another sector within the common page boundary of the first plurality of sectors;
   encoding error correction coding (ECC) bits for the data corresponding to the first plurality of sectors and the another sector, taken as a unitary data block;
   programming a second page of the memory to store the data and the ECC bits.

16. The method of claim 10, wherein the encoding and decoding steps operate according to a Reed-Solomon code.

17. The method of claim 10, wherein the encoding and decoding steps operate according to a BCH code.

18. A method of controlling writes and reads to a flash memory device, the flash memory device having a plurality of memory cells arranged in pages, each page having sufficient capacity to store data corresponding to a plurality of sectors, and the pages arranged into blocks, comprising the steps of: receiving, from a host system, user data for at least a first sector to be written to the flash memory device, the user data comprising data generated by a user of, or an application on, the host system; responsive to the received data being less than a full page of data, forming a data block comprising the received data and also including control data, wherein the control data comprises data relating to operation or management of the flash memory device corresponding to a sector not including user data and not including header data associated with user data; encoding error correction coding (ECC) bits over the data block, so that the ECC bits are encoded using both the user data and the control data together; and programming a first page of a first selected block in the flash memory device to store the data of the data block and the ECC bits.

19. The method of claim 18, wherein the data block further comprises a copy of data previously stored in the flash memory device.

20. The method of claim 18, further comprising:
   receiving data for a second sector corresponding to the same page as that of the first sector;
   reading the programmed first page of the first selected block decoding the read first page, using the ECC bits, to recover the data bits as a unitary data block comprising the data corresponding to the first sector;
   forming a data block comprising the first and second sectors;
   encoding error correction coding (ECC) bits for the data block comprising the first and second sectors;
   programming a second page of the memory to store the encoded data block.

21. The method of claim 20, wherein the second page is in the first selected block.

22. The method of claim 21, wherein the data block comprising the first and second sectors further comprises control data.

23. The method of claim 20, wherein the second page is in a second selected block of the flash memory device; and
   wherein the control data comprises an update block pointer, for pointing to the second selected block.

24. The method of claim 23, wherein the first selected block is a scratchpad block, and wherein the second selected block is an update block.

25. The method of claim 18, wherein the control data comprises data of a type selected from the group consisting of logical and physical block address tables for the flash memory device; indices, pointers, and offsets for data structures in the memory; and wear leveling data for the memory.

26. The method of claim 18, wherein the encoding and decoding steps operate according to a Reed-Solomon code.

27. The method of claim 18, wherein the encoding and decoding steps operate according to a BCH code.

28. The method of claim 18, wherein the first selected block is a scratchpad block.

* * * * *